United States Patent [19]
Rockwell, Jr. et al.

[11] Patent Number: 5,928,446
[45] Date of Patent: *Jul. 27, 1999

[54] PROCESS FOR MANUFACTURING A DUST CONTROL MAT INCLUDING REINFORCING STRIPS FOR ENHANCED TEAR RESISTANCE

[75] Inventors: James N. Rockwell, Jr.; William O. Burke, III; Robert C. Kerr, all of LaGrange, Ga.

[73] Assignee: Milliken Research Corporation, Spartanburg, S.C.

[ * ] Notice: This patent is subject to a terminal disclaimer.

[21] Appl. No.: 09/060,739

[22] Filed: Apr. 15, 1998

Related U.S. Application Data

[63] Continuation-in-part of application No. 08/455,429, May 31, 1995, Pat. No. 5,834,086, which is a continuation-in-part of application No. 08/265,926, Jun. 27, 1994, abandoned.

[51] Int. Cl.[6] ........................................ A46D 1/00
[52] U.S. Cl. ................ 156/72; 428/61; 428/77; 428/82; 428/85; 428/95; 428/96; 428/126; 428/192; 428/198; 264/243; 264/510; 156/60; 156/299; 156/300
[58] Field of Search ..................... 428/85, 95, 96, 428/198, 77, 126, 192, 62, 61, 82, 492; 156/60, 300, 299, 72; 204/510, 243, 552

[56] References Cited

U.S. PATENT DOCUMENTS

| | | | |
|---|---|---|---|
| 2,053,144 | 9/1936 | Gowdy | 154/2 |
| 2,254,210 | 9/1941 | Cunnington | 154/49 |
| 3,306,808 | 2/1967 | Thompson et al. | 161/66 |
| 3,953,631 | 4/1976 | Gordon | 428/95 |
| 3,956,551 | 5/1976 | Richards | 428/88 |
| 4,741,065 | 5/1988 | Parkins | 15/217 |
| 4,886,692 | 12/1989 | Kerr et al. | 428/82 |
| 5,227,214 | 7/1993 | Kerr et al. | 428/95 |
| 5,233,787 | 8/1993 | Andersen | 43/132.1 |
| 5,240,530 | 8/1993 | Fink | 156/94 |
| 5,305,565 | 4/1994 | Nagahama et al. | 52/177 |
| 5,350,478 | 9/1994 | Bojstrup et al. | 156/299 |

*Primary Examiner*—Deborah Jones
*Assistant Examiner*—Abraham Bahta
*Attorney, Agent, or Firm*—Terry T. Moyer; William S. Parks

[57] ABSTRACT

A process for the application of tear resistant side and edge strip materials to a rubber base sheet of a launderable dust control mat is provided. The process involves the in-line mating of first and second strips of carboxylated rubber to the longitudinal borders of a rubber sheet and the in-line mating of third and fourth strips of carboxylated rubber to the leading and tailing edges of a rubber sheet, respectively, all by means of a series of pressure rolls. The process permits separate rubber sheet and side strip materials to be joined in a continuous or semicontinuous operation immediately prior to assembly of a mat thereby enhancing material handling efficiencies. Dust mats produced thereby are also provided.

20 Claims, 9 Drawing Sheets

FIG. -11-

PROCESS FOR MANUFACTURING A DUST CONTROL MAT INCLUDING REINFORCING STRIPS FOR ENHANCED TEAR RESISTANCE

CROSS-REFERENCES TO RELATED APPLICATIONS

This application is a continuation-in-part of application Ser. No. 08/455,429, filed May 31, 1995 for PROCESS FOR MANUFACTURING A DUST CONTROL MAT INCLUDING SIDE STRIPS FOR ENHANCED TEAR RESISTANCE filed in the name of Robert C. Kerr et al., now Pat. No. 5,834,086 which is a continuation-in-part of application Ser. No. 08/265,926 filed Jun. 27, 1994 for DUST CONTROL MAT WITH CO-CALENDARED REINFORCING STRIPS filed in the name of Robert C. Kerr, now abandoned. The disclosures of these applications are incorporated herein by reference.

FIELD OF THE INVENTION

The present invention relates to the production of a dust control mat and more particularly to a process and related apparatus for the manufacture of a dust control mat including reinforcing edge and side strips for enhanced tear resistance. Specifically, the process of the present invention provides for the in-line joinder of such reinforcing strips to a rubber backing sheet material by automated pressure application means.

BACKGROUND OF THE PRIOR ART

During its practical use as a mat and its periodic wash and drying processing in industrial laundries, the primary physical damage that is encountered by a rubber backed, press molded mat is tearing at both the edges and the longitudinal borders. Such washing processes are effectuated in well known rotary washings machines which apply appreciable stress and force on the subject mats. The same holds true during the industrial rotary drying procedures, too. Thus, such mats must possess suitable flexibility to withstand the rigors of such industrial laundering. Such flexibility, however, may facilitate damage to the mats due to the aforementioned tearing during industrial laundering. Thus, suitable reinforcement is required to prevent tearing during the stress of such industrial laundry applications. This tearing typically occurs at the edge of the piled textile covering on the mat. The edge of the piled textile covering is referred to as the border interface on the mats. Previous attempts to alleviate this problem have basically only included placing reinforcement strips around a rubber mat backing sheet by hand, subjecting the sheet to a vulcanization step, and cutting, again, by hand, the residual excess border strips from the mat. Such a process inevitably results in non-uniform reinforcement and a general lack of aesthetics for the majority of mats produced with hand-laid reinforcement strips. A more uniform manner of producing more aesthetically and better performing mats is thus necessary.

The art includes a number of configurations and features for various floor mats. Some patents which are believed to be illustrative of known mats include U.S. Pat. No. 2,254,210 to Cunnington, issued Sep. 2, 1941; U.S. Pat. No. 3,306,808 to Thompson, et al. issued Feb. 28, 1967; U.S. Pat. No. 3,953,631 to Gordon issued Apr. 27, 1976; U.S. Pat. No. 4,741,065 to Parkins issued May 3, 1988; U.S. Pat. No. 4,886,692 to Kerr et al. issued Dec. 12, 1989; U.S. Pat. No. 5,227,214 to Kerr et al. issued Jul. 13, 1993; U.S. Pat. No. 5,240,530 to Fink issued Aug. 31, 1993; U.S. Pat. No. 5,305,565 to Nagahama et al. issued Apr. 26, 1994; and U.S. Pat. No. 5,350,478 to Bojstrup et al. issued Sep. 27, 1994; all of which are incorporated herein by reference.

The construction of mats using rubber backing sheets which nonetheless provide good tear resistance has generally been limited to the following methods:

1. The formulation of high tear and high tensile strength rubber in a uniform thick sheet (typically 59–65 mils) which extends beyond the dimensions of the pile covering; and
2. The construction of a five piece rubber mat backing which constitutes a uniform thick (typically 40–45 mils) sheet which serves as the body piece and which is smaller in dimensions than the textile covering and four strips of rubber (typically twice as thick as the body piece) which are manually placed beneath the textile edges of the mat.

In the vulcanization of a rubber backed mat with a textile covering, the edges of the textile tend to embed deeper within the rubber as compared to other portions of the mat. This embedding is believed to result from the rubber flow at the border of the textile covering as pressure is applied from an inflatable diaphragm and the rubber undergoes reduced viscosity due to the application of heat. As will be appreciated, the unrestrained rubber movement in the border allows the longitudinal edges of the textile to move deeper into the rubber backing thus creating a thinning of the rubber at the border interface. As indicated previously, it is this thinner interface which is susceptible to tears during the mat's use and industrial laundry processing. Such industrial laundry processing entails the introduction of these rubber-backed mats into automated washing machines and, subsequently, rotating dryers.

In attempts to alleviate such tearing of the rubber mat, the industry has relied on the two previously described methods of production. Method 1 has an advantage of minimum labor requirements and cycle times but requires the use of a relatively thick rubber backing which tends to make the mat heavier and to increase raw material costs. Method 2 permits the use of a thinner rubber backing which is desirable for laundry processing. However, the five piece construction has the drawback of requiring additional labor to carry out placement of the edge portions and longer vulcanization times to cure the thicker rubber edges compared to the thinner body section beneath the textile covering.

It has been suggested that built up edge strips may be co-calendared with the rubber backing sheet as the backing sheet is produced. Thereafter, the backing sheet material (including the built up edges) may be delivered in roll form to the mat manufacturing location. While such a co-calendaring operation is effective in producing rubber sheets with enhanced edge thickness, it has been found that there is some difficulty in the handling of rolls of such co-calendared material since the edges have a thickness several mils thicker than the interior. Due to this difference in thickness, a roll of the material takes on a substantially dog-bone profile wherein the outer edges of the roll are of greater diameter than the center. As will be appreciated, this disparity in diameter increases dramatically with any increase in the outer edge thickness. Moreover, a significant disparity in roll diameter may give rise to difficulty in later processing steps as the backing material is drawn off the roll for production of the mat. Specifically, with a significant difference in diameter along the length of the roll it may be difficult to maintain a constant feed of the backing material without the occurrence of folds or wrinkles along the surface of the material.

In light of the above, it will be appreciated that there is a need for a process and apparatus to apply efficiently a tear-resistant border to a rubber backing sheet for a dust control mat as an in-line operation during the assembly of the mat. The present invention thus represents a useful advancement over prior practice.

OBJECT OF THE INVENTION

In view of the foregoing, it is a general object of the present invention to provide a process for the application of tear resistant edge strip material to a rubber base sheet of a launderable dust control mat.

In that respect, it is an object of the present invention to provide a process and related apparatus for the in line application of edge strip material to a rubber base sheet during production of a launderable dust control mat.

It is a related object of the present invention to provide a process and related apparatus for the automated application rubber edge strip material to a rubber base sheet of a launderable dust control mat wherein the edge strip material is joined to the base sheet of rubber by the concurrent mating and application of pressure prior to vulcanization of the rubber sheet material.

Accordingly, in one aspect of the present invention a method for producing a dust control mat including side strips for enhanced tear resistance is provided. The method comprises the steps of:

(a) optionally, simultaneously mating first and second strips of perforated carboxylated rubber to the longitudinal borders of a rubber sheet;

(b) optionally, joining said first and second strips of perforated carboxylated rubber to said rubber sheet by means of pressure applied by a plurality contacting rollers while step "a" is ongoing;

(c) optionally, mating a third strip of perforated carboxylated rubber simultaneously to the leading edge of said rubber sheet;

(d) optionally, joining said third strip of perforated carboxylated rubber to said leading edge of said rubber sheet by means of pressure applied by a contacting roller;

(e) mating a fourth strip of perforated carboxylated rubber simultaneously to the tailing edge of said rubber sheet;

(f) joining said fourth strip of perforated carboxylated rubber to said tailing edge of said rubber sheet by means of pressure applied by a contacting roller;

(g) delivering said rubber sheet to an in-line cutter following either of joining steps "d" or "f";

(h) cutting said rubber sheet to a designed length;

(i) placing a pile fabric on said rubber sheet to form a pile composite; and (j) vulcanizing said pile composite to form a unitary structure.

Steps "c" and "d" may occur either prior to or after steps "a" and "b". Also, steps "a" and "b" may be omitted, altogether, leaving only the pressure application of the single strip to the leading and/or tailing edges of two separate sheets. However, step "f" must follow step "d".

Alternatively, and preferably, the inventive method entails the mating of one strip, prior to in-line cutting of the rubber sheet, to both the tailing edge of a first rubber sheet and the leading edge of a second subsequent sheet. This strip must have a width (2L) twice as wide as each individual longitudinal strip (L). Each of the longitudinal strips may be from about ½ an inch to about 4 inches wide, preferably 2 inches, thus the third strip may be from about 1 to about 8 inches in width, with 4 inches being preferred. Once this strip is joined to the two edges of the different mats, the in-line cutter then may separate the two rubber sheets leaving the first sheet having strips on all borders and the second sheet having one 2 inch (preferably) reinforced border. The second sheet then undergoes steps "a" and "b", above, followed by the same pressure application of a single 4 inch (preferably) strip to the tailing edge of that sheet and the leading edge of another subsequent sheet. Furthermore, it is possible to sever the first rubber sheet from the second rubber sheet prior to the application of a strip to the tailing edge of the first sheet and a separate strip to the leading edge of the second sheet. In fact, the initial application of a strip to the initial end of a roll of rubber sheeting would be performed in such a manner since there would not be a tailing edge of a rubber sheet to be covered by this initial reinforcing strip.

Although such an initial reinforcement application may save a small amount of carboxylated rubber, it is also possible to utilize a wide reinforcement strip with an extra amount protruding from the leading edge of the roll of rubber sheeting. This extra amount of reinforcement strip may then be removed by cutting or other means. The remaining roll of rubber sheeting is thus reinforced as noted above. The end of the entire rubber sheeting roll is treated in a similar manner.

It is imperative that minimal overlap of side and edge reinforcement strips occurs because if the aggregate amount of backing sheet and reinforcement strips is too thick, vulcanization may not fully cure the rubber components. Such a problem may result in a dust mat which is easy to tear apart. To avoid such a possibility, an overlap of at most one-quarter of an inch is preferred between side and edge reinforcement strips with lower measures of overlap obviously most preferred. In the most preferred method, the third strip of reinforcing carboxylated rubber (edge strip) must have a length equal to the length of the leading and tailing edges of said mats less the width of the longitudinal strips. In this manner, the third strip is contacted with said edges whereupon there is not a double reinforcement of rubber at the four corners of each mat. Alternatively, then, in another most preferred method, the longitudinal strips may have lengths equal to the length of the mat less half the width of the third strip in order to ensure the same type of effective vulcanization is accorded the user.

This method may furthermore be employed upon multiple rubber sheets at the same time on one piece of machinery, rather than be limited to a single application at one time. Also, any further applications or treatment of the rubber backing and reinforcement strips are contemplated, such as perforating the backing for improved drying after industrial laundering.

While the invention will be described in connection with preferred embodiments and procedures, it is to be understood that the invention is in no way intended to be limited by such description. On the contrary, it is intended to cover all alternatives, modifications and equivalents as may be included within the true spirit and scope of the invention as defined by the claims appended hereto.

DETAILED DESCRIPTION OF THE DRAWINGS

Figure 1:
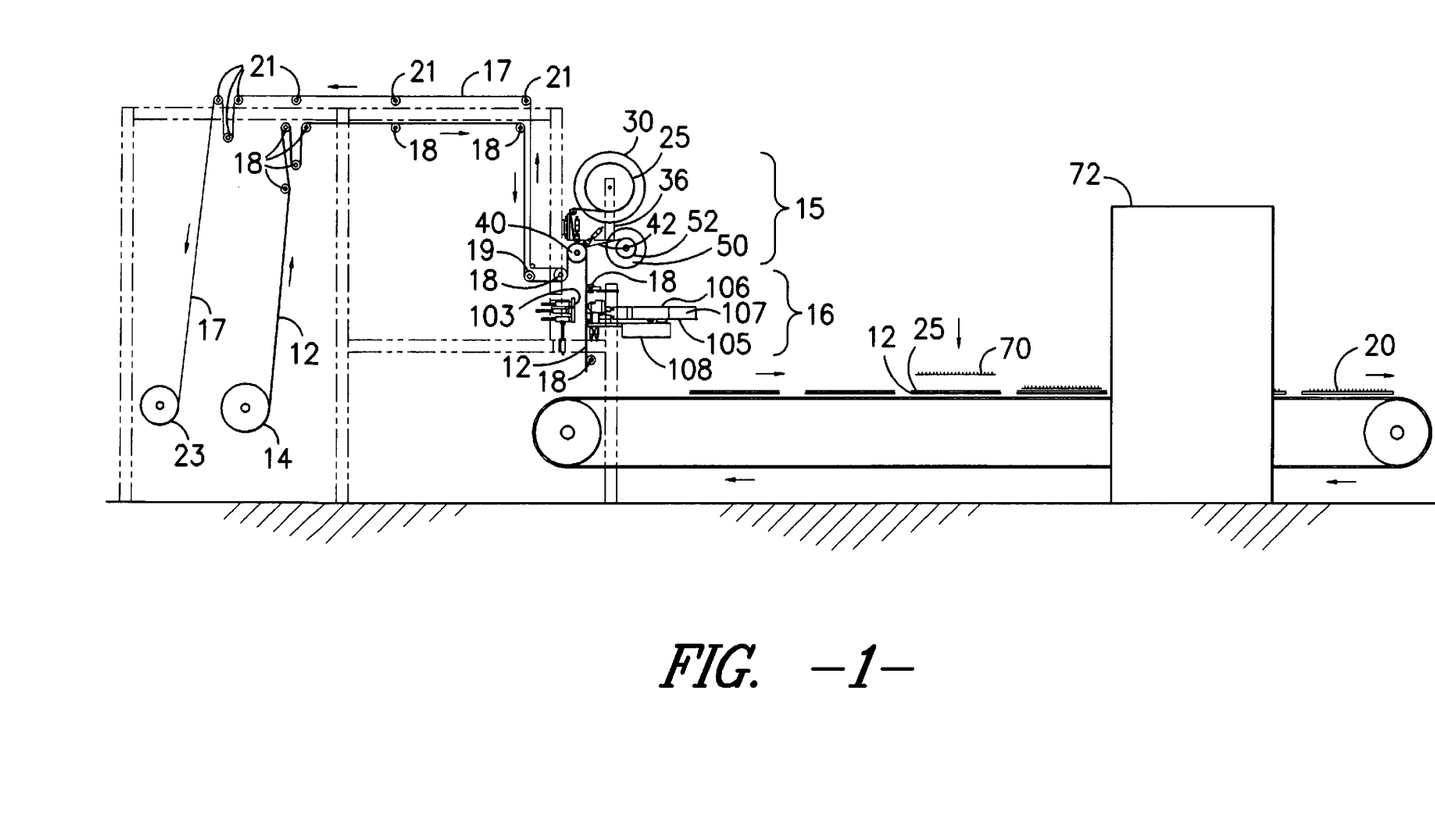
FIG. 1 is a schematic of the process and apparatus of the present invention.

Turning now to the drawings wherein like reference numerals designate like components in the various views, in FIG. 1 there is shown in profile a schematic of the process and related apparatus of the present invention. In the illustrated and preferred practice, a mat backing sheet 12 of green (i.e., unvulcanized) rubber is delivered from a mounted roll 14 along a path to a side strip application station 15, as described further below, and then an end strip application station 16, also described further below. The mat backing sheet is preferably between about 36 inches wide and about 48 inches wide with a thickness of between about 40 mils and about 65 mils.

Figure 2:
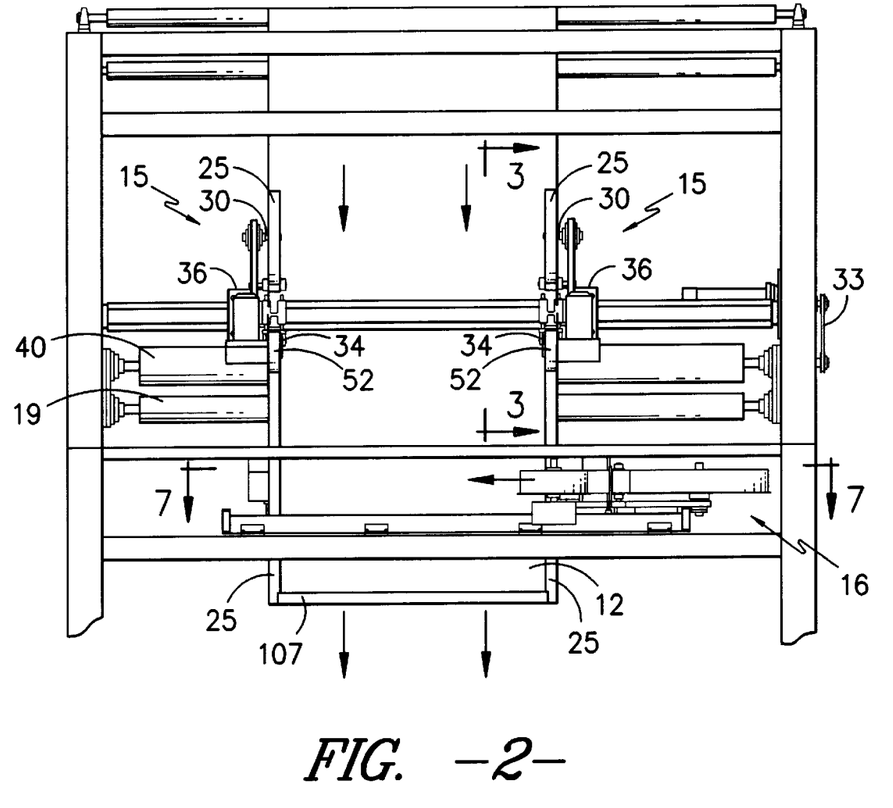
FIG. 2 is a side view illustrating the longitudinal and edge strip pressure bonding processes of the present invention.

As will be appreciated, the rubber of the mat backing sheet is relatively soft and tacky. The rubber is therefore typically covered with a detachable film covering 17 which may be stripped away from the rubber after it is unrolled for processing (FIG. 2).

As shown in FIG. 1, in the preferred practice the mat backing sheet 12 along with its corresponding film covering 17 are delivered over a plurality of adjustable rollers 18 which are used to provide uniform tension to the mat backing sheet 12 as it is delivered for processing. The rubber of the mat backing sheet is susceptible to developing creases and other discontinuities across the surface during processing. The detachable film 17 is believed to help prevent the occurrence of such discontinuities by enhancing the stability of the mat backing. In the preferred practice, the detachable film is therefore removed after the mat backing sheet has been conveyed nearly to the side strip application station 15 and taken away by a drive assembly 19 and moved through a plurality of adjustable rollers 21 into a roll of used film material 23 which may then be recycled.

Figure 10:
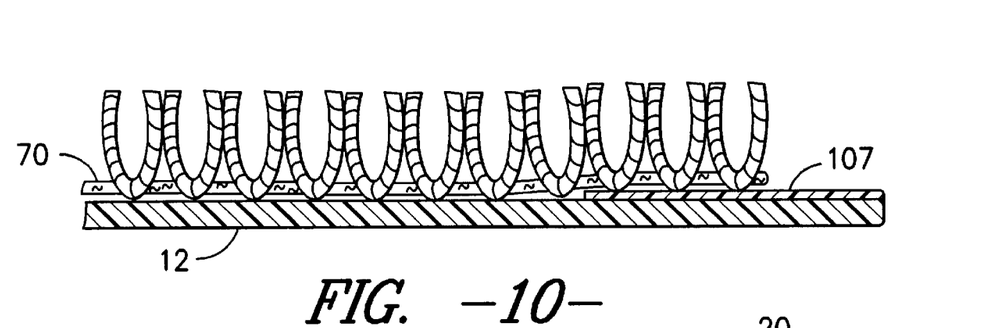
FIG. 10 is a view along line 8—8 of FIG. 9 prior to vulcanization.

A mat 20 produced by the process of the present invention is illustrated in FIG. 10. Strong non-tufted borders 22, 24 (FIG. 10) are desirable along the lateral edges of the mat 20 to avoid tears during use and cleaning.

Since the mat backing sheet is best handled in roll form but is susceptible to creases and folds, it may be undesirable to have a border in place prior to forming the roll 14 (FIG. 1). If a built-up border is in place when the roll 14 is formed, the outer diameter of the roll 14 will be substantially greater than the diameter at the center of the roll. This difference in diameter may make it difficult to effect uniform delivery of the roll material for further processing. By way of example, it has been found that a 59 mil rubber backing sheet with a co-calendared border built up greater than 10 mils is susceptible to an undue number of creases when the rubber backing is unrolled.

Figure 3:
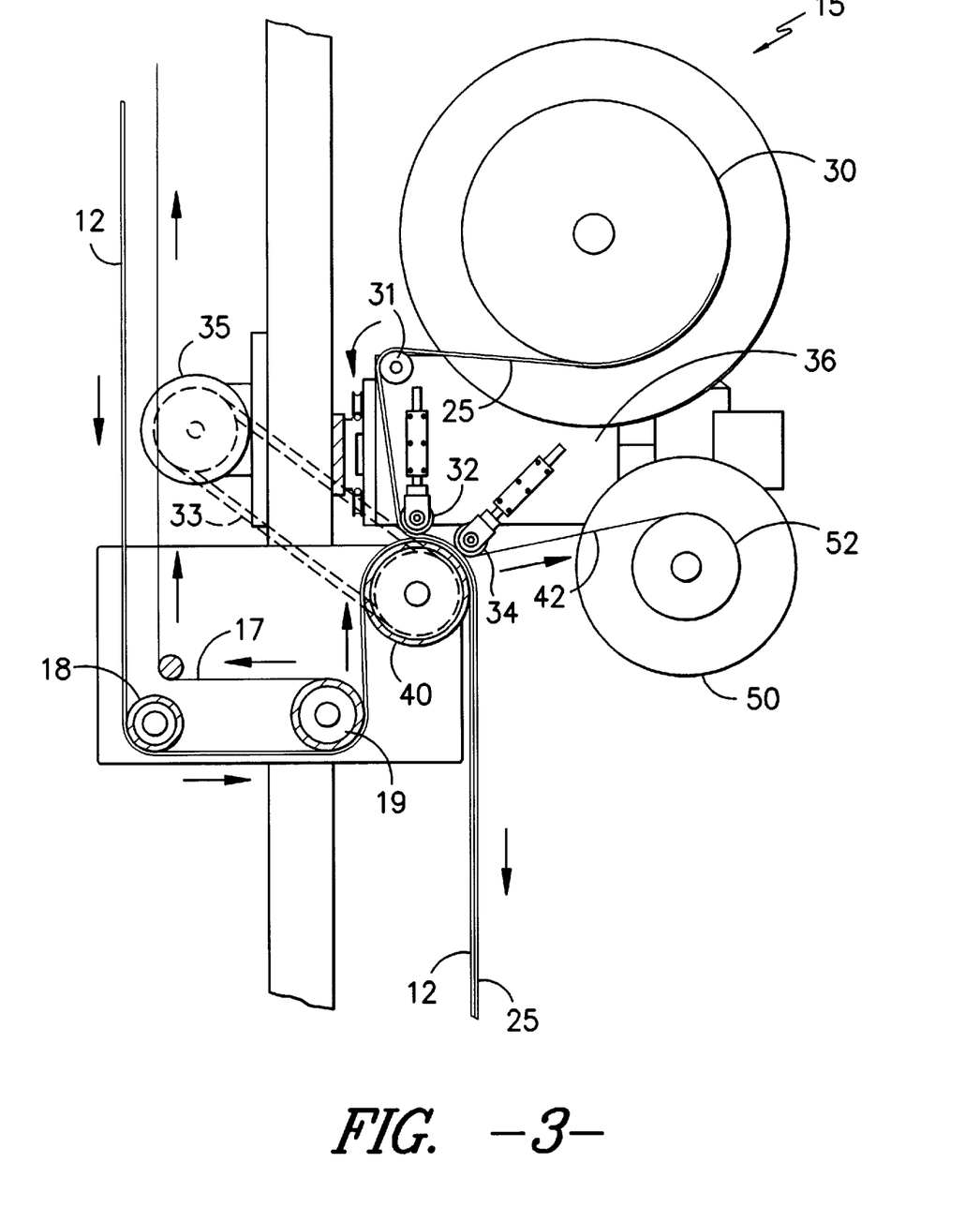
FIG. 3 is a view taken along line 3—3 of FIG. 2.
Figure 4:
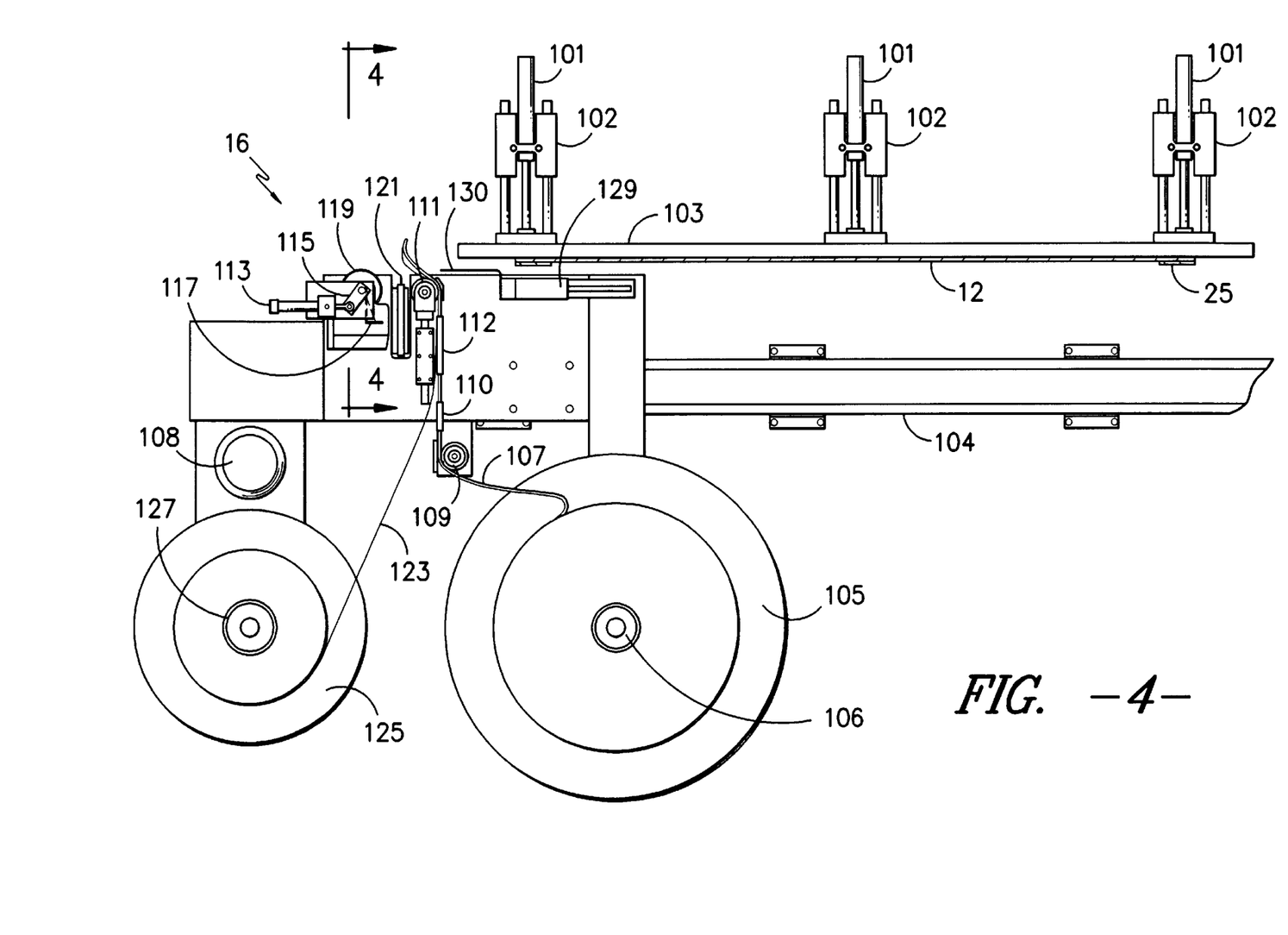
FIG. 4 is a top view illustrating the edge strip bonding station of the present inventive process prior to the application step.

As shown in FIGS. 1, 2, and 3, the process of the present invention permits the in-line application of a side strip 25 along the border of the mat backing sheet 12 after the backing sheet 12 is unrolled. This allows for uniformity in the backing sheet roll 14 while still permitting the advantages of a built-up border. Moreover, the border which is applied in the present process may have a thickness up to about 60 mils. Furthermore, the inventive process also permits the in-line application of an edge strip 107 along the tailing and leading borders of the mat backing sheet 12 after the application of the side strip 25 to the backing sheet 12. In actuality, the application of side strips 25 to the backing sheet 12 is a continuous process with intermittent pauses while the end strip 107 is applied. After simultaneous end strip application to both the tailing edge of one backing sheet 12 and the leading edge of another backing sheet 12 (which, at the time of application is actually one sheet with an edge strip applied perpendicularly to the direction of the side strips 25). The first sheet is then separated from the second backing sheet which results in half of the edge strip 107 remaining on the severed sheet and the other half of the edge strip remaining on the other sheet. The means for cutting the sheets apart is located within the edge strip application station 16 and performs its cutting function simultaneously with the edge strip application, as discussed in greater detail below.

Referring primarily to FIG. 3, but also to FIG. 2, in the illustrated and preferred practice, reinforcing side strips 25 of carboxylated rubber are delivered from two laterally spaced strip supply rolls 30 through two laterally spaced guide rolls 31 for attachment to the outboard edges of the mat backing sheet 12. This attachment is effected by the application of pressure across side strips 25 as they are in contact with the edge of the rubber mat backing. As illustrated, this pressure attachment is preferably carried out by two pneumatic pressure rolls 32, 34 arranged in series along the path of the edge strip material. The first pressure roll 32 preferably has a slightly knurled surface and applies a pressure of about 10 psig while the second pressure roll 34 is preferably substantially smooth and applies a pressure of about 10 psig. The edge strips 25 are preferably about 2 inches wide with slight perforations to promote the elimination of entrapped air between the edge strips and mat backing sheet. As will be appreciated, while it may be desirable to apply the edge strips 25 simultaneously to opposing outboard edges of the mat backing sheet the strips could likewise be applied in individual separate operations.

As shown, the strip supply rolls 30 along with the first and second pressure rolls 32, 34 are preferably disposed at either edge of the path traveled by the mat backing sheet 12. In the preferred embodiment, these rolls 30, 32, 34 are moveable by adjustment of pin assemblies (not illustrated) to change the width of the setting so as to permit processing of mat backing sheets having a range of widths. A motor 36 drives these rolls 30, 32, 34 upon engagement with the backing sheet 12 in order to apply the side strips 25.

It will be appreciated that the delivery of the side strip 25 should be synchronized with the delivery of the mat backing sheet to the point of pressure application so as to permit the concurrent mating and joinder side strip material along the border of the mat backing sheet. In the illustrated and potentially preferred practice, this synchrony is achieved by use of a common roll 40 for unrolling both the backing sheet and the side strips. This roll 40 is actually driven by a drive belt (or chain) 33 which is attached to a drive sprocket 35. By using a common drive roll 40 which spans the width of the backing sheet, uniform delivery rates are achieved at all areas.

Since the rubber of the side strips 25 is somewhat tacky, it is covered on one side with a detachable film 42 similar to that which is used on the mat backing sheet 12. As best seen in FIG. 2, this film is preferably removed immediately following the pressure application of the side strip 25 to the border of the mat backing sheet 12. This arrangement permits the first and second pressure rolls 32, 34 to contact the side strips 25 with the benefit of a protective barrier.

After the pressure joining operation, the detachable film 42 from the side strips is preferably drawn away from the side strip application station by a drive assembly 50 to form a roll of used film material 52 which may then be recycled.

During practice of the present invention, the rubber backing sheet 12, and side strips 25 along with the protective film 42 are threaded into place. Thereafter, the drive roll 35 is activated, thereby activating the drive belt 33, which in turn drives the common roll 40 and a side strip 25 is applied along any desired length of the mat backing sheet 12. The application of side strips 25 continues until the leading edge of the backing sheet 12 reaches the edge strip application station 16 (FIGS. 1, 4, 5, 6, and 7). At that point, the side strip application pauses until the edge strip application and cutting procedures are completed.

In FIGS. 4, 5, 6, and 7, a support bar 103 engages the backing sheet at the angle and along the path which the movable end strip application station carriage 108 will take during the end strip 107 application process. This support bar 103 provides a sturdy application and cutting surface and may be disengaged by the use of hydraulically controlled cylinders 102 which are located within directional housings 102 to ensure the support bar 103 will support the backing sheet 12 along a straight plane perpendicular to the direction of the side strips 25. The end strip 107 is actually located on roll 106 of reinforcement material which itself is present on a rotating disc 105. Upon engagement of the application end strip station 16, a motor 108 forces the end strip material 107 around a guide roll 109 and through a series of two guides 110, 112 and around a pressure roll 109, which is similar to the pressure rolls 32, 34 (FIG. 2) utilized for the application of the side strips 25, and preferably has a knurled surface. A portion of the end strip material 107 is permitted to remain past the pressure roll 109 during the intermittent period of dormancy for the end strip application station 16 in order to provide a sufficient amount of end strip material 107 for the start of the next application cycle. Upon engagement, then, between the end strip application station 16 and the backing sheet, the station 16 moves along a gutter rail 104 by means of an automated drive (not illustrated).

Figure 5:
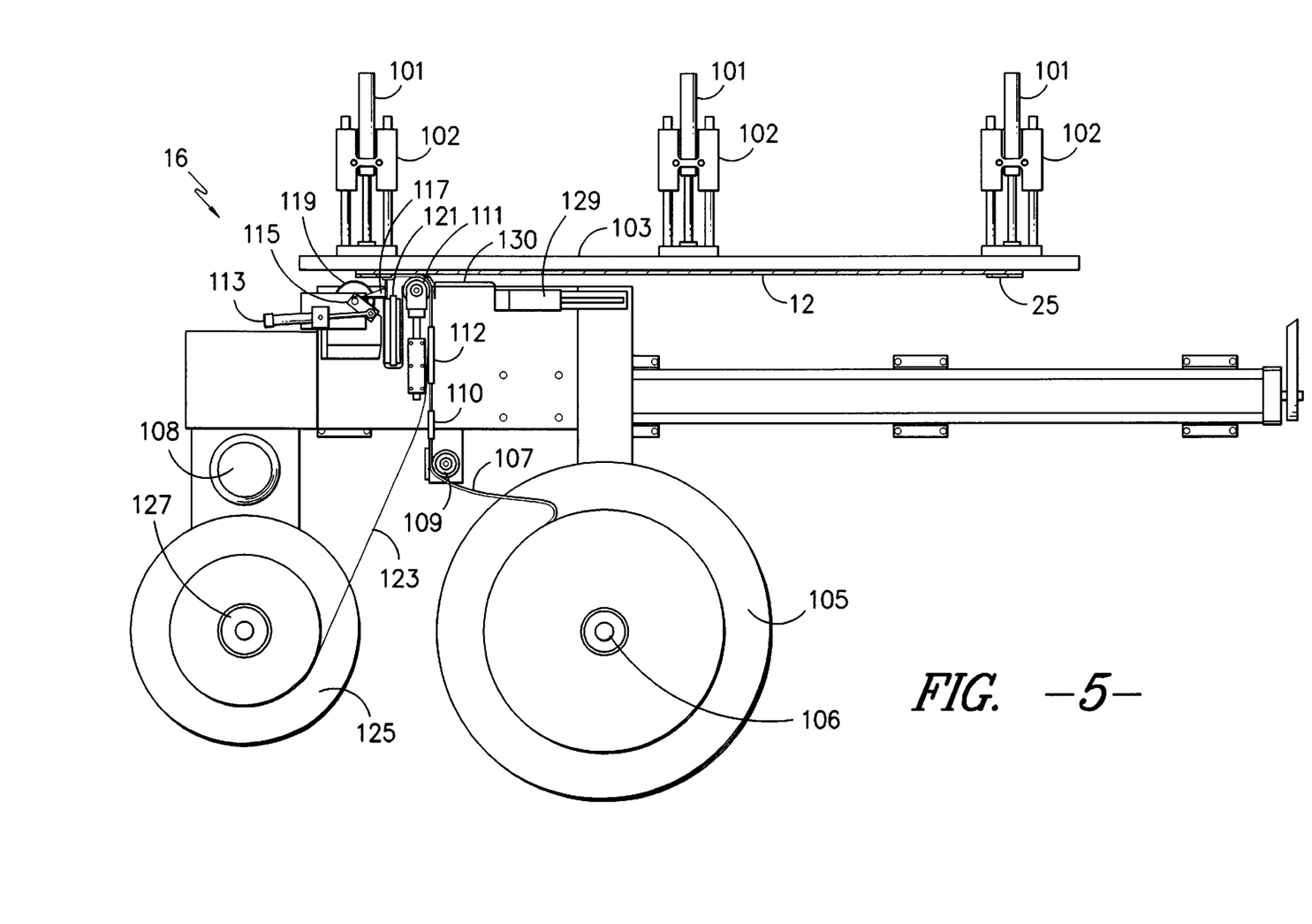
FIG. 5 is a top view illustrating the edge strip bonding station of the present inventive process during an initial stage of the application step.

As illustrated in FIG. 5, upon initial engagement, the free extended end of the end strip material 107 is held in place with a small clip 117 which is moved into place by means of an hydraulically controlled cylinder 113 which pushes a lever 115 into the clip 117. This clip 117 presses the tacky end strip material 107 onto the backing sheet 12 for sufficient time and under sufficient pressure for the end strip material to remain adhered to the backing sheet 12. The pressure roll 109 is then moved, by hydraulic pressure means into contact with the remaining end strip material 107 which then becomes adhered to the backing sheet 12.

Figure 6:
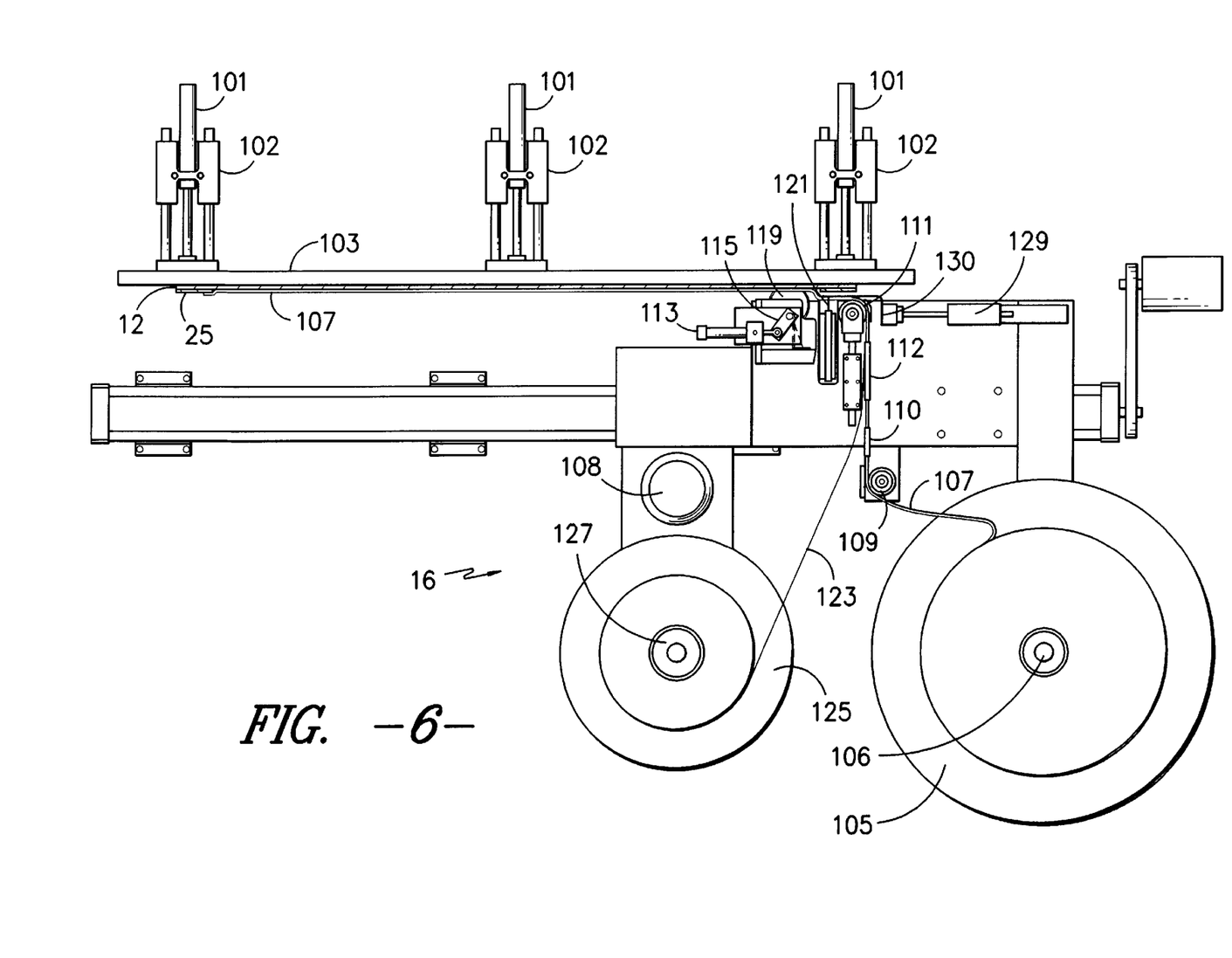
FIG. 6 is a top view illustrating the edge strip bonding station of the present inventive process during the final stage of the application step.
Figure 7:
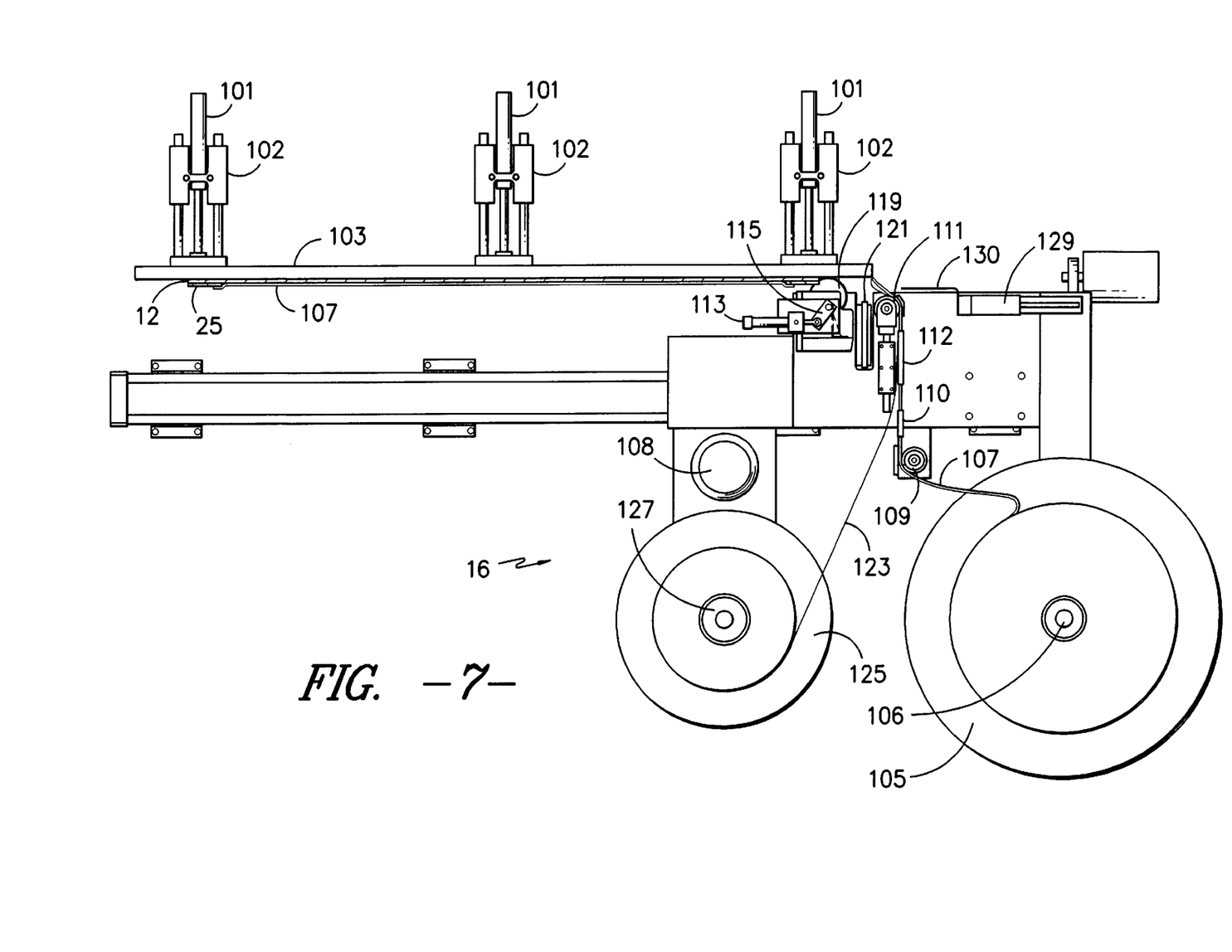
FIG. 7 is a view along line 7—7 of FIG. 2 illustrating the edge strip bonding station of the present inventive process after the application step during the cutting step.

As illustrated in FIG. 6, the pressure roll 109 rolls along the path of the end strip material 107 effectively adhering and pressing the end strip material 107 onto the surface of the backing sheet 12. When the station 16 ends its movement along the gutter rail 104 a hydraulic cylinder 129 pushes a bracket 130 in place between the end strip material 107 and the backing sheet 12 which, at that specific area, has been reinforced with a side strip 25. A vertically oriented rotating blade 121 then cuts the end strip material 107 leaving a sufficiently long strip of the end strip material 107 adhered to the backing sheet 12. The bracket 130 prevents the vertically oriented rotating blade 121 from cutting through the entire backing sheet 12 and also, upon contact and pushing by the vertically oriented rotating blade 121, the bracket 130 acts as a flat surface which aids in adhering the last portion of end strip material 107 to the backing sheet 12.

Figure 8:
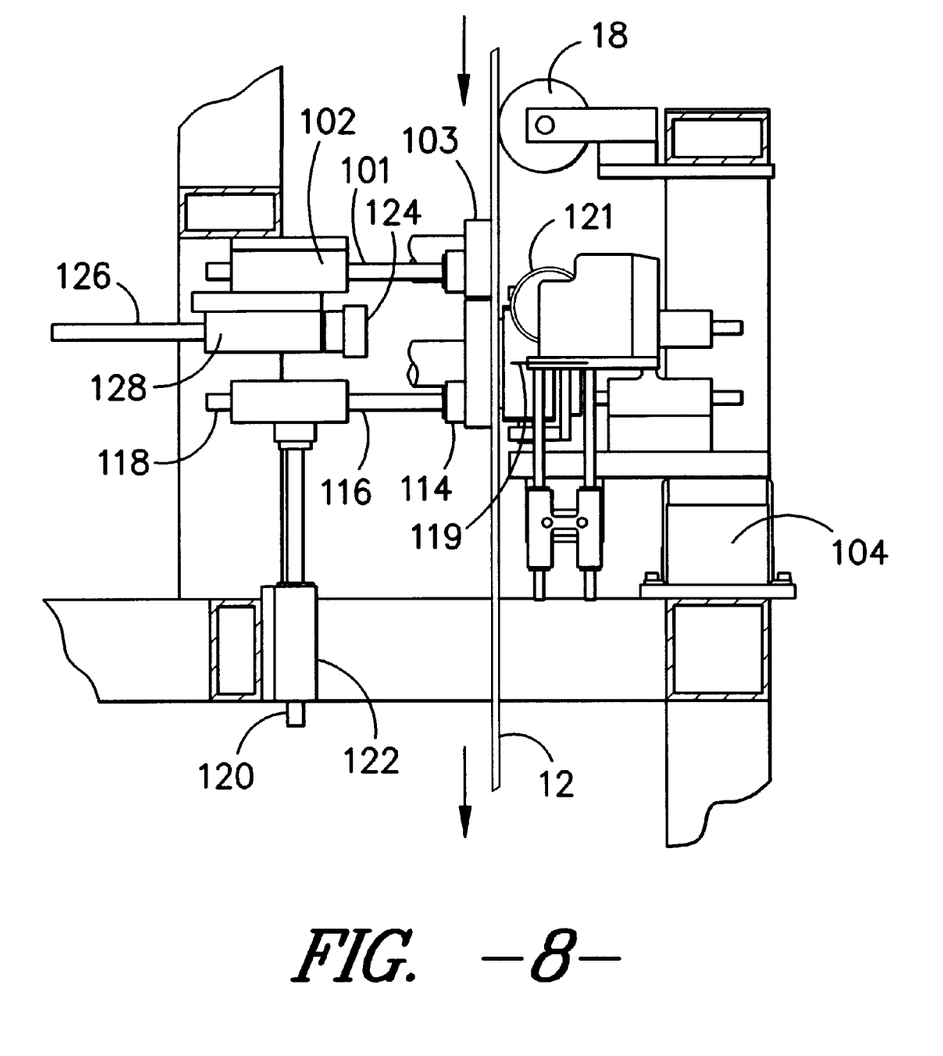
FIG. 8 is a side view along line 4—4 of FIG. 4.

As also noted in FIG. 8, during the pressing procedure a horizontally oriented rotating blade 119 cuts both the end strip material 107 in half and one backing sheet 12 from another backing sheet 12 (thereby leaving a strip of material 107 on the tailing edge of one backing sheet 12 and another equally wide strip of material 107 on the leading edge of the other backing sheet 12). Following the final cutting steps, the station 16 returns to its initial position to await the next application. In such a procedure, the width of the end strip material 107 prior to the cutting of the backing sheet 12 is generally measured as equalling 2L while the side strips 25 have widths measuring L, wherein L is from ½ to about 4 inches, with 2 inches preferred. In other words, the pre-cut end strip material 107 has a width twice as wide as that of the side strips 25. Upon cutting, then, each of the side strips 25 and end strips 107 would be of equal width.

Alternatively, the end strip material 107 may be applied to the backing sheet 12 whereupon the horizontally oriented blade 119 severs the backing sheet 12 from the remaining backing sheet material 12 along a plane leaving no end strip material 107 on the leading edge of the subsequent backing sheet 12. At that point, the end strip station 16 would then apply a strip of end strip material 107 to said leading edge of the backing sheet 12. In such an alternative procedure, then the end strip material 107 would have a width measured as L (equal to the width of the side strips 25), and thus, again, after the cutting step, all of the reinforcement strips 25, 107 would have the same widths.

Furthermore, in FIG. 8, it is noted that the support bar 103 is only one of as many as three supports 103, 114, 124 which allow for greater widths of end strip material 107 to be applied or even greater lengths of end strip material 107 to be applied (such as permitting an strip 107 having a length equal to the width of the backing sheet 12). As with the top support bar 103, the lowest support 114 may be retracted by means of a group of hydraulically controlled plungers 116 directed through housings 118 to ensure straight movement. However, the lowest support 114 also can be moved in a vertical position by means of a second group of hydraulically controlled plungers 120 (through second housings 122) on which the first housings 120 rest. Thus, third intermediate plungers 126 (through third housing 128) may also be engaged in order to provide a wider and/or longer support bar 124.

As seen in FIGS. 4, 5, 6, and 7, as with the backing sheet 12 and side strips 25, after the pressure joining operation, a detachable film 123 from the end strip material 107 is preferably drawn away from the end strip application station and rolled into a drive roll 127 located on a rotatable disc 125 to form a roll of used film material which may then be recycled.

Figure 9:
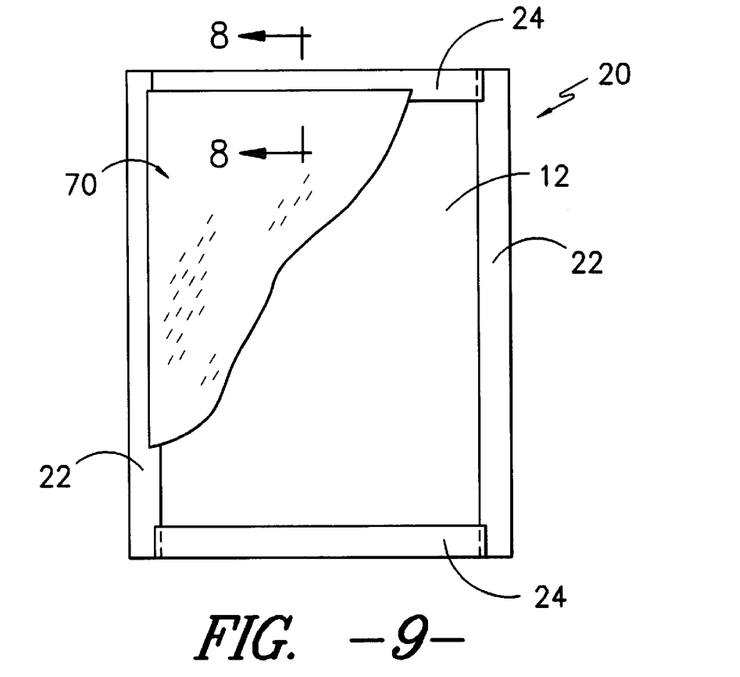
FIG. 9 is a top view in partial cross section illustrating the rubber backed mat produced by the process of the present invention.

Referring back to FIG. 1, the fully reinforced rubber backing sheet 12 is thereafter placed on an endless conveyor and indexed to a station where a textile substrate 70 such as a tufted pile substrate is placed in overlying relation to the backing sheet such that the edges of the textile substrate overlap a portion of the applied borders 22 (FIG. 9). The textile substrate and backing are then conveyed to a vulcanizing unit 72 as is well known to those of skill in the art. In the potentially preferred practice, the vulcanization is carried out for about 2–27 minutes using steam maintained at a pressure of about 70 psig.

Figure 11:
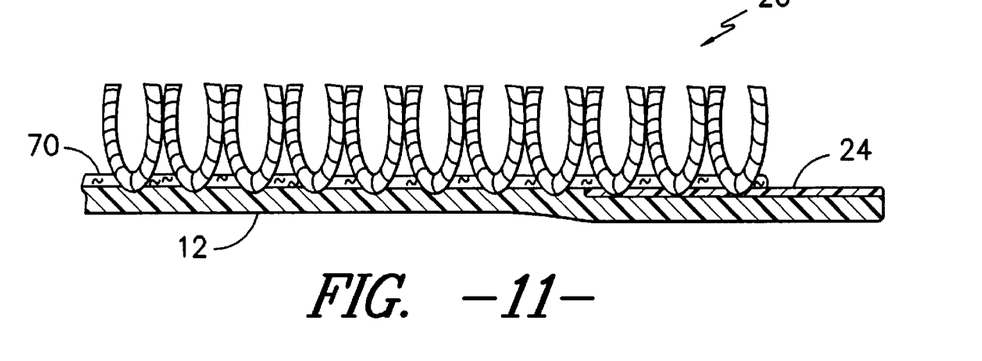
FIG. 11 is a view similar to FIG. 10 following vulcanization.

The resultant finished mat 20 is more fully illustrated in FIGS. 9, 10, and 11. Resultant reinforced side borders 22 (FIG. 9) and end borders 24 (FIGS. 9 and 11) are obtained upon vulcanization of the mat 20. Prior to vulcanization, a pile surface 70 is placed on the mat overlapping minimally with the side strips 25 (as seen in FIGS. 2 and 3) and the end strips 107 (FIG. 10) and with the reinforced borders 22, 24 after the vulcanization step is completed (FIGS. 9 and 11). FIG. 10 illustrates the applied end strip 107 to the backing sheet 12 after placement of the pile surface 70, all prior to vulcanization. FIG. 11 thus shows the same area after vulcanization wherein the end strip material 107 (FIG. 10) has become permanently adhered as a reinforcement border 24 on the backing sheet 12 to which the pile surface 70 has also become permanently adhered.

As previously indicated, the preferred material for both the side and edge strips 25, 107 is a carboxylated nitrile rubber. By application of such strips 25, 107, the resulting tensile strengths at the mat borders are approximately twice that of pure nitrile rubber.

In light of the above, it will be appreciated that the present invention provides a process and related apparatus for the in-line application of longitudinal, leading, and tailing reinforcing rubber borders providing substantially enhanced tear resistance to pile fabric dust control mats. Of course, the first side strip applications may be deleted from the inventive process, if so desired, although the following of such process steps are preferred.

While specific embodiments of the invention have been shown and described, it will be understood, of course, that the invention is not limited thereto, since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What we claim is:

1. In an in-line process for the production of a dust mat, a method comprising the steps of:
   (a) optionally, mating at least a first strip of carboxylated rubber to a first longitudinal border of a rubber sheet;
   (b) optionally, joining said first strip of carboxylated rubber to said rubber sheet by application of pressure applied by at least one contacting roller to said first strip of carboxylated rubber while mating step "a" is ongoing;
   (c) optionally, mating at least a second strip of carboxylated rubber to a second longitudinal border of said rubber sheet;
   (d) optionally, joining said second strip of carboxylated rubber to said sheet of rubber sheet by application of pressure applied by at least one contracting roller to said second strip of carboxylated rubber while mating step "c" is ongoing;
   (e) mating at least a third strip of carboxylated rubber to the leading edge of said rubber sheet;
   (f) joining said third strip of carboxylated rubber to the leading edge of said rubber sheet by application of pressure applied by at least one contacting roller to said third strip of carboxylated rubber while mating step (e) is ongoing;
   (g) mating at least a fourth strip of carboxylated rubber to the tailing edge of said rubber sheet;
   (h) joining said fourth strip of carboxylated rubber to the tailing edge of said rubber sheet by application of pressure applied by at least one contacting roller to said fourth strip of carboxylated rubber while mating step (g) is ongoing;
   (i) delivering said rubber sheet an in-line cutter following either of joining steps "d" or "h";
   (j) cutting said rubber sheet to a designed length,
   (k) placing a pile fabric on said rubber sheet to form a pile composite; and
   (l) vulcanizing said pile composite to form a unitary structure.

2. The method of claim 1 wherein
   steps "a", "b", "c", and "d" are followed and said delivering step "i" is performed directly after joining step "d".

3. The method of claim 1 wherein
   said delivering step "i" directly follows joining step "h".

4. The method of claim 2 wherein
   mating steps "a" and "c" are carried out concurrently.

5. The method of claim 4 wherein
   joining steps "b" and "d" are carried out concurrently.

6. The invention as, in claim 1, wherein
   at least a portion of said contacting rollers have a knurled surface.

7. The invention as in claim 1, wherein
   said first, second, third, and fourth strips of carboxylated rubber are perforated and each have a thickness of greater than about 10 mils.

8. The invention as in claim 7, wherein
   said rubber sheet has a thickness not greater than about 65 mils.

9. In an in-line process for the production of a dust mat, a method comprising the steps of:
   (a) optionally, simultaneously mating first and second strips of perforated carboxylated rubber to the longitudinal borders of a first rubber sheet;
   (b) optionally, joining said first and second strips of perforated carboxylated rubber to said first rubber sheet by means of pressure applied by a plurality of contacting rollers while step "a" is ongoing;
   (c) mating a third strip of perforated carboxylated rubber to both the tailing edge of said first rubber sheet and the leading edge of a second rubber sheet;
   (d) joining said third strip of perforated carboxylated rubber to said tailing edge of said first rubber sheet and said tailing edge of said second rubber sheet by means of pressure applied by at least one contacting roller while step "c" is ongoing;
   (e) delivering said rubber sheet directly to an in-line cutter following joining step "d";
   (f) cutting said first rubber sheet to a desired length, wherein at least a portion of said third strip remains in contact with the tailing edge of said first rubber sheet and at least a portion of said third strip remains in contact with the leading edge of said second rubber sheet;

(g) placing a pile fabric on said rubber sheet to form a pile composite; and (h) vulcanizing said pile composite to form a unitary structure.

10. The method of claim 9 wherein said first and second strips are present and said first, second, and third strips of perforated carboxylated rubber each have a thickness greater than about 10 mils.

11. The method of claim 10 wherein said rubber sheet has a thickness not greater than about 65 mils.

12. The method of claim 9 wherein steps "a" and "b" are present and carried out concurrently and steps "c" and "d" are carried out concurrently.

13. The method of claim 9 wherein the width of said first and second strips is defined as L and the width of said third strip is defined as 2L.

14. The method of claim 13 wherein

L is from about ½ to about 4 inches.

15. The method of claim 14 wherein

L is 2 inches.

16. The invention as in claim 9, wherein at least a portion of said contacting rollers have a knurled surface.

17. A dust control mat produced by the method of claim 1.

18. A dust control mat produced by the method of claim 8.

19. A dust control mat produced by the method of claim 9.

20. A dust control mat produced by the method of claim 11.

* * * * *